No. 821,609. PATENTED MAY 29, 1906.
H. COLLOSEUS.
APPARATUS FOR PULVERIZING BLAST FURNACE SLAG.
APPLICATION FILED AUG. 14, 1905.

Witnesses Inventor

UNITED STATES PATENT OFFICE.

HEINRICH COLLOSEUS, OF BERLIN, GERMANY.

APPARATUS FOR PULVERIZING BLAST-FURNACE SLAG.

No. 821,609.              Specification of Letters Patent.              Patented May 29, 1906.

Application filed August 14, 1905. Serial No. 274,160.

*To all whom it may concern:*

Be it known that I, HEINRICH COLLOSEUS, a subject of the German Emperor, residing at Berlin, Germany, have invented certain new and useful Improvements in Apparatus for Pulverizing Blast-Furnace Slag, of which the following is a specification.

This invention relates to a new or improved apparatus for pulverizing melted blast-furnace slag with the aid of a suitable liquid or liquids—for instance, aqueous solutions of salts—in such a manner that the slightly-hydraulic slag is converted into an anhydrous product having the properties of good cement.

Various forms of apparatus are known for pulverizing liquid blast-furnace slag, the method adopted for this purpose consisting in most cases in conducting the slag to rotating drums, cones, or disks.

According to the present invention the slag is also conducted toward the circumference of a rapidly-rotating drum, the ends of which are open and the interior of which is divided into a plurality of compartments by means of partitions, which also serve to strengthen the structure. The circumference of the drum is provided with slots or circular orifices and preferably with external longitudinal ribs parallel with its axis. The aqueous liquid with which the slag is to be treated is conducted under pressure into the interior of the drum by means of a perforated annular tube or the like and is owing to the rapid rotation of the drum projected through the slots or orifices against the liquid slag flowing toward the drum. The rotating drum also acts as a fan, so that the liquid and air passing outward through the orifices are projected with considerable force against the molten slag. By this means the latter is finely granulated or pulverized and converted into an anhydrous product, which need not be subjected to any further drying treatment, since the comparatively small quantity of water contained in the injected solution is immediately evaporated.

One form of the invention is illustrated, by way of example, in the annexed drawings, in which—

Figure 1:
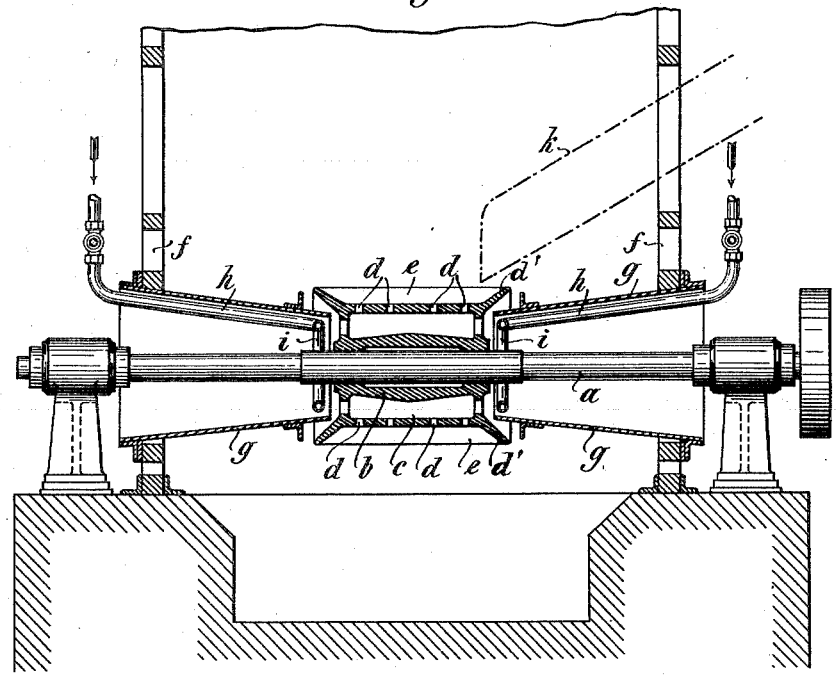
Figure 2:
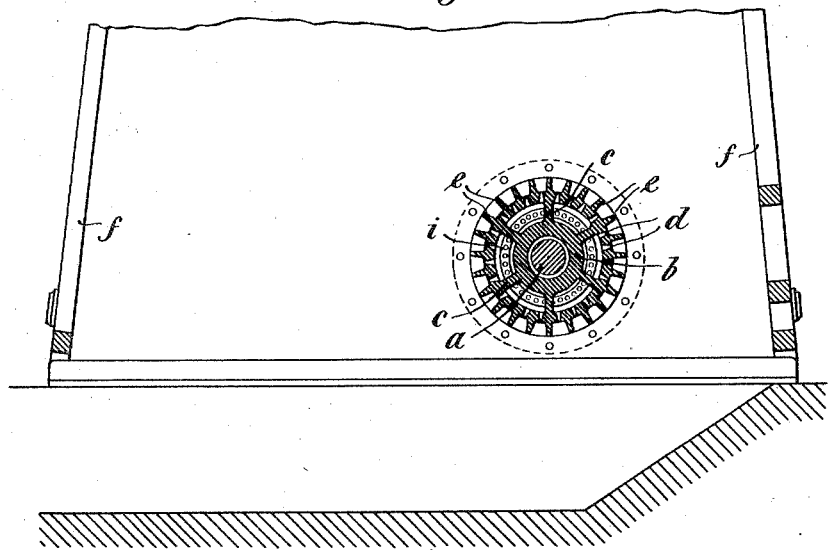

Figure 1 is a longitudinal section of the apparatus, and Fig. 2 a cross-section thereof.

The drum $b$, which is provided with internal partitions $c$ and longitudinal ribs $e$, is fixed to a shaft $a$, adapted to be driven by means of a suitable motor. Nozzle-like orifices $d$ are provided in the outer circumferential wall of the drum, and inclined circumferential flanges $d'$ are arranged at the ends of the latter to prevent the slag from falling onto the shaft $a$ and its bearings. The drum is surrounded by a chamber or casing $f$, the walls of which act as screens against which the pulverized slag is thrown. Conical conduits $g$ extend into the chamber $f$ and terminate near the open ends of the drum $b$ in order to allow air to be sucked into the latter in consequence of the rapid rotational movement imparted by the shaft $a$. Pipes $h$ extend through the conduits $g$ for the purpose of conducting to the drum the liquid with which the slag is to be treated. Each of the said pipes terminates in an annular tube $i$, perforated on the side facing the respective end of the drum. A chute $k$ (indicated by dot-and-dash lines) extends into the chamber $f$ and serves to convey the molten slag to the drum.

The action of the apparatus is as follows: The rapid rotation of the drum causes the liquid under pressure injected through the tubes $i$ to be thrown against the outer wall of the drum and forced through the orifices $d$. This liquid is mixed with the air sucked through the conduits $g$, and the mixture of air and liquid comes with great force into contact with the liquid slag which flows from the chute $k$. Experiments have shown that this slag does not reach the outer surface of the drum, but is pulverized and dispersed before it comes into contact with the said surface. As has already been mentioned, the pulverized or finely-granulated product need not be subjected to a drying process before use.

What I claim as my invention, and desire to secure by Letters Patent of the United States, is—

1. Apparatus for disintegrating, granulating and powdering molten slags, comprising in combination a hollow open-ended substantially cylindrical rotary drum with a perforated circumferential wall, liquid delivering and distributing means in said open ends, and tubular stationary extensions of said cylindrical drum, substantially in axial alinement with the same and surrounding said liquid-delivering means.

2. Apparatus for disintegrating, granulating and powdering molten slag, comprising in combination a hollow open-ended, substantially cylindrical rotary drum with a perforated circumferential wall, annular liquid delivering and distributing means at said open ends and substantially concentric with the outer circumferential walls of said drum, and tubular, outwardly-flaring, stationary extensions at said open ends in axial alinement with the same and surrounding said liquid-delivering means.

3. Apparatus for disintegrating, granulating and powdering molten slags, comprising in combination a hollow, open-ended, substantially cylindrical drum with a perforated circumferential wall, liquid-delivering means in said open ends and substantially concentric with the outer circumferential wall of the drum, tubular, stationary extensions at said open ends and substantially in axial alinement with the same, and means for delivering the molten material upon the outer circumferential wall only and means for preventing the molten material from flowing over the end parts of the cylindrical drum.

4. Apparatus for disintegrating, granulating and powdering molten slags, comprising the combination with molten-slag-delivering means of a hollow, rotary, substantially cylindrical, open-ended drum with a perforated circumferential wall, means in said open ends for conveying air-currents into the interior of said drum, liquid-supplying means, substantially concentric with the outer circumferential wall at said open ends, and projections at the edges of said circumferential wall for preventing the molten material from flowing to the lower-lying parts of said drum.

5. In apparatus for pulverizing blast-furnace slag, the combination of a rotatable drum having orifices in its outer circumferential wall, and divided into a plurality of compartments in communication with said orifices, means for conveying molten slag onto said drum, means whereby air is supplied to said drum-compartments by the rotation of the latter and means for supply of liquid under pressure to the drum-compartments aforesaid substantially as described.

6. In apparatus for pulverizing blast-furnace slag, the combination of an outer chamber, a rotatable drum therein having orifices in its outer circumferential wall, and divided into a plurality of compartments in communication with said orifices, means for conveying molten slag onto the drum, air-conduits extending within the chamber and terminating adjacent the ends of the drum and means for supplying liquid under pressure to the aforesaid drum-compartments substantially as described.

7. In apparatus for pulverizing blast-furnace slag the combination of an outer chamber, a rotatable drum therein having orifices in its outer circumferential wall, and divided into a plurality of compartments in communication with said orifices, longitudinal ribs on the exterior of said drum, means for conveying molten slag onto the latter, air-conduits extending within the chamber and terminating adjacent the ends of the drum, liquid-supply pipes traversing said conduits, and annular perforated tubes in communication with said supply-pipes and adapted to discharge liquid into the compartments of the drum.

8. In apparatus for pulverizing blast-furnace slag the combination of an outer chamber, a rotatable drum therein having orifices in its outer circumferential wall, partitions and longitudinal ribs in the interior and on the exterior of said drum respectively, inclined circumferential flanges located at the ends of the drum, a chute for conveying molten slag onto the latter, conical air-conduits extending within the chamber and terminating adjacent the ends of the drum, liquid-supply pipes traversing said conduits, and annular perforated tubes in communication with said supply-pipes and adapted to discharge liquid into the drum substantially as described.

In witness whereof I have signed this specification in the presence of two witnesses.

HEINRICH COLLOSEUS.

Witnesses:
HENRY HASPER,
WILLIAM MAYNER.